United States Patent
El-sawah et al.

(10) Patent No.: US 11,721,108 B2
(45) Date of Patent: Aug. 8, 2023

(54) SYSTEM AND METHOD FOR TRAINING TRAILER DETECTION SYSTEMS

(71) Applicant: Ford Global Technologies, LLC, Dearborn, MI (US)

(72) Inventors: Mohamed El-sawah, Farmington Hills, MI (US); Robert Bell, New Hudson, MI (US); Scott Howard Gaboury, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 433 days.

(21) Appl. No.: 17/093,731

(22) Filed: Nov. 10, 2020

(65) Prior Publication Data

US 2022/0147742 A1  May 12, 2022

(51) Int. Cl.
*G06V 20/56* (2022.01)
*G06N 3/08* (2023.01)
*B60W 50/14* (2020.01)
*B60W 10/20* (2006.01)
*G06F 18/214* (2023.01)

(52) U.S. Cl.
CPC ............ *G06V 20/56* (2022.01); *B60W 10/20* (2013.01); *B60W 50/14* (2013.01); *G06F 18/214* (2023.01); *G06N 3/08* (2013.01); *B60W 2050/146* (2013.01); *B60W 2420/42* (2013.01); *B60W 2556/45* (2020.02); *B60W 2720/24* (2013.01)

(58) Field of Classification Search
CPC ...... G06V 20/56; G06V 10/454; G06V 10/82; B60W 10/20; B60W 50/14; B60W 2050/146; B60W 2420/42; B60W 2556/45; B60W 2720/24; G06F 18/214; G06F 9/451; G06N 3/08; G06N 3/045; G06N 3/04; B60D 1/58
USPC ........................................................ 382/181
See application file for complete search history.

(56) References Cited

U.S. PATENT DOCUMENTS

| | | | |
|---|---|---|---|
| 9,102,271 B2 | 8/2015 | Trombley et al. | |
| 9,731,568 B2 | 8/2017 | Wuergler et al. | |
| 10,059,161 B1* | 8/2018 | Salter | B60D 1/26 |
| 10,532,698 B2 | 1/2020 | Potnis et al. | |
| 10,628,690 B2 | 4/2020 | Herman et al. | |
| 10,780,752 B1* | 9/2020 | Niewiadomski | B60D 1/62 |
| 2014/0358429 A1* | 12/2014 | Shutko | B60W 50/14 701/458 |
| 2017/0341583 A1* | 11/2017 | Zhang | B60R 1/00 |
| 2018/0251153 A1 | 9/2018 | Li et al. | |

(Continued)

FOREIGN PATENT DOCUMENTS

| | | | | |
|---|---|---|---|---|
| DE | 102019119404 | * | 1/2020 | B60R 1/00 |
| EP | 3081405 | * | 10/2016 | B60D 1/62 |
| GB | 2541898 | * | 3/2017 | G01G 19/12 |

*Primary Examiner* — Jerome Grant, II
(74) *Attorney, Agent, or Firm* — Frank Lollo; Price Heneveld LLP

(57) ABSTRACT

A method for modifying a trailer detection routine for a vehicle trailer detection system includes identifying a trailer in image data via a trailer detection model and activating a detection training routine for the trailer. The method further includes capturing the image data of the trailer from a plurality of perspectives relative to a trailer heading of the trailer and controlling an update procedure configured to generate a modified trailer detection model operable to detect the trailer.

20 Claims, 9 Drawing Sheets

(56) References Cited

U.S. PATENT DOCUMENTS

| | | |
|---|---|---|
| 2018/0253608 A1 | 9/2018 | Diessner et al. |
| 2018/0272941 A1 | 9/2018 | Bliss et al. |
| 2019/0092109 A1 | 3/2019 | Carpenter |
| 2019/0094872 A1 | 3/2019 | Li et al. |
| 2019/0176699 A1* | 6/2019 | Naserian ................. B60R 11/04 |
| 2020/0130582 A1 | 4/2020 | Wong et al. |
| 2020/0164803 A1* | 5/2020 | Jales Costa ........ B62D 15/0285 |
| 2020/0247471 A1* | 8/2020 | Grodde .................. G06V 20/58 |
| 2020/0317127 A1* | 10/2020 | Archer .................. G01S 17/931 |
| 2020/0327748 A1* | 10/2020 | Thompson ............... G07C 5/08 |
| 2020/0346581 A1* | 11/2020 | Lawson ................ B60R 1/0612 |

\* cited by examiner

SYSTEM AND METHOD FOR TRAINING TRAILER DETECTION SYSTEMS

FIELD OF THE DISCLOSURE

The present disclosure generally relates to a system for assisting in a vehicle-trailer hitching operation. In particular, the present disclosure relates to a system for identifying a trailer and identifying features of a trailer for alignment assistance between a vehicle and the trailer.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sightlines requires an inference of the positioning of the hitch ball and hitch based on experience with a particular vehicle and trailer and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause contact between the vehicle and the trailer. Accordingly, further advancements may be desired.

SUMMARY OF THE INVENTION

In one aspect, a trailer identification system for a vehicle is disclosed. The system includes an imaging device configured to capture image data depicting a trailer and a user interface configured to communicate with a user. A controller processes the image data and applies a trailer detection model configured to detect a trailer depicted in the image data. The controller activates a detection training routine for the trailer and captures the image data of the trailer from a plurality of perspectives relative to a trailer heading of the trailer. The controller further controls an update procedure configured to generate a modified trailer detection model operable to detect the trailer. The update procedure processes the image data from the plurality of perspectives.

In various aspects, the system includes one or more of the following features, configurations, or steps:
  the controller further receives an input via the user interface identifying a feature of the trailer, and identifies the trailer heading based on an orientation of the feature in the image data;
  the controller further applies a label identifying the feature in response to the input, wherein the trailer identification model is modified based on the image data and the label identifying the feature;
  the update procedure comprises communicating the image data to a remote server, wherein the remote server processes the image data and modifies the trailer identification model via a neural network;
  the controller further receives a modified trailer identification model form the remote server; captures additional image data of the trailer with the modified trailer detection model, and, in response to detecting the trailer in the image data with the modified trailer detection model, communicates a verification of the detection to the remote server;
  the controller is further configured to display instructions on a display of the user interface, wherein the instructions demonstrate the plurality of perspectives for alignment;
  the instructions communicate a target position of the vehicle enabling the user to control the vehicle to align with the plurality of perspectives;
  the controller further calculates a vehicle path based on the image data, and controls a power steering system and a powertrain of the vehicle traversing the vehicle path, wherein the vehicle path aligns the vehicle with at least one of the plurality of perspectives;
  the controller further communicates with a remote device comprising a camera, wherein the image data depicting the trailer is further captured via the camera and communicated to the controller;
  the detection training routine is activated in response to an error of a detection routine to identify the trailer in the image data; and/or
  the error results from a detection of the trailer not satisfying a predetermined confidence threshold.

In another aspect, a method for modifying a trailer detection routine for a vehicle trailer detection system is disclosed. The method comprises identifying a trailer in image data via a trailer detection model and activating a detection training routine for the trailer. The method further comprises capturing the image data of the trailer from a plurality of perspectives relative to a trailer heading of the trailer and controlling an update procedure configured to generate a modified trailer detection model operable to detect the trailer.

In various aspects, the system includes one or more of the following features, configurations, or steps:
  receiving an input via the user interface identifying or verifying a feature of the trailer, and identifying the trailer heading based on an orientation of the feature in the image data;
  applying a label identifying the feature in response to the input, wherein the trailer identification model is modified based on the image data and the label identifying the feature;
  controlling the update procedure comprises communicating the image data to a remote server, and modifying the trailer identification model by supplying the image data to a neural network based on the image data and the label;
  displaying instructions demonstrating the plurality of perspectives for alignment shown relative to the trailer, wherein the instructions communicate a target position of the vehicle enabling the user to control the vehicle to align with the plurality of perspectives;
  calculating a vehicle path based on the image data, and controlling a power steering system and a powertrain of the vehicle traversing the vehicle path, wherein the vehicle path aligns the vehicle with at least one of the plurality of perspectives; and/or
  the image data comprises first image data captured via an imaging system of a vehicle and second image data captured via a camera of the remote device, and wherein the method further comprises communicating with a remote device comprising a camera, wherein the image data depicting the trailer is further captured via the camera of the remote device.

In yet another aspect, a trailer identification system for a vehicle comprises an imaging device configured to capture image data depicting a trailer and a user interface configured to communicate with a user. A controller activates a detection training routine for the trailer. The trailer training routine comprises processing the image data and applying a trailer detection model configured to detect a trailer depicted in the image data and identifying a trailer heading based on an orientation of the feature in the image data. The controller further captures the image data of the trailer from a plurality of perspectives relative to a trailer heading of the trailer and controls an update procedure configured to generate a modified trailer detection model operable to detect the trailer. The update procedure processes the image data from the plurality of perspectives. In some aspects, the controller of the system further receives an input via the user interface identifying a feature of the trailer and displays instructions on a display of the user interface. The instructions demonstrate the plurality of perspectives for alignment.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
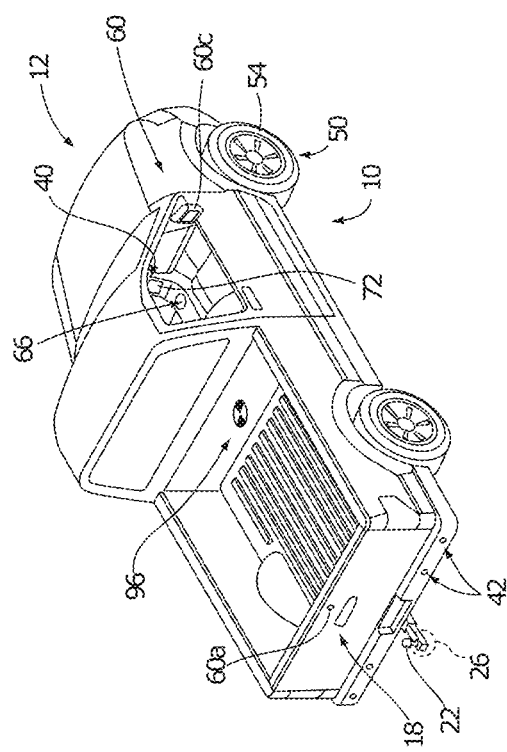
FIG. 1 is a perspective view of a vehicle in an unhitched position relative to a trailer.
Figure 1:
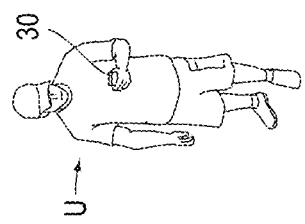
Figure 1:
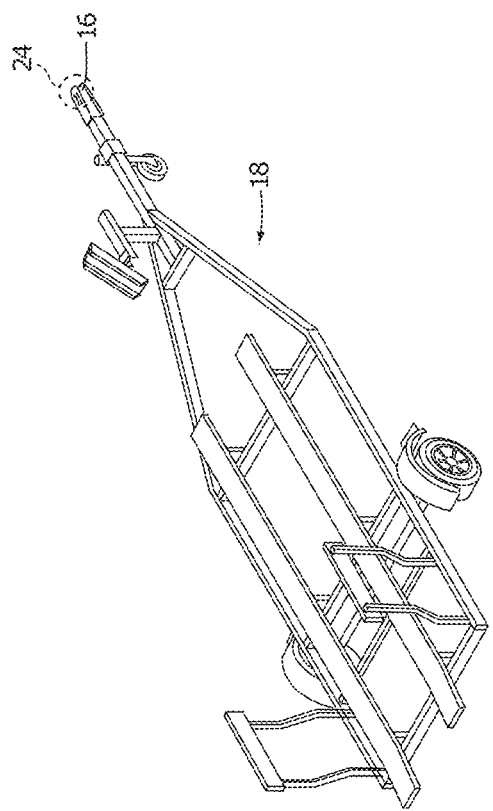

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring generally to FIGS. 1-4, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch 22 (e.g., a hitch ball) of the vehicle 12 with the coupler 16. Deriving the vehicle path 20 may include a variety of steps including detecting and compensating for a change in a coupler position 24 to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide improved navigation of the vehicle 12 and/or interaction with the coupler 16, such that trailer 18 may be effectively connected to the vehicle 12 without complication.

In various instances, the acquisition of the positional data of the coupler 16 as discussed herein may include the capture and processing of image data. In order to identify that the image data depicts the trailer 18 and, more specifically, the coupler position 24 of the coupler 16, the system 10 may process the image data with a trailer detection model. The trailer detection model may be implemented as a trained model consisting of algorithms and processing steps that evaluate the image data and determine whether an object or characteristics depicted conform to a trailer type for which the trailer detection model is trained to detect such that the coupler position 24 may be accurately identified. Accordingly, the disclosure provides for the detection of a trailer type associate with that depicted in the image data, such that the system 10 may maneuver the vehicle toward the coupler position 24 for connection.

To assess the image data and identify the trailer 18, the system 10 may process the image data via the trailer detection model, which may include the comparison of attributes (e.g., lines, shapes, and their spatial relationships) of the image data to previously defined or taught attributes in a library of compatible trailers. Such a library may be programmed into software of a controller of the system 10 and may identify the trailer type corresponding to the trailer 18 based on a variety of image processing techniques (e.g.

edge detection, background subtraction, template matching, etc.). However, due to the extraordinary variety of trailer types and the corresponding characteristics, the identification capability for the less common trailers may be somewhat limited in the preconfigured software provided with the vehicle 12.

To improve the operating capability of the system 10 to recognize and detect the trailer 18, the disclosure provides for an interactive procedure, wherein the user U may interact with the vehicle 12 and/or a remote device 30 to capture image data of the trailer 18. Accordingly, if the system 10 is not capable of identifying the trailer 18 based on the preconfigured software supplied with the vehicle 12, the disclosure provides for a method and system for training the system 10 to accurately detect the trailer 18 in the image data such that a compatibility of the trailer 18 and the coupler position 24 of the coupler 16. As further discussed in reference to FIG. 5, the provided systems and methods may utilize a neural network to improve the robustness and accuracy of the system 10 to identify new or previously untrained types of trailers. The neural network may be configured to learn how to accurately detect the previously unidentified trailers or variations in know trailer types that cause the preprogrammed or factory configured detection models to be unable to identify a trailer. In this way, the disclosure provides for an improved method for training the system 10 to identify new trailer types previously untrained or tune the trained models supplied in the factory or original software to improve the robustness of the detection of a type of the trailer 18 to better identify the coupler position 24. These and other aspects of the disclosure are further detailed in the following description, particularly in reference to FIGS. 5-9.

Figure 2:
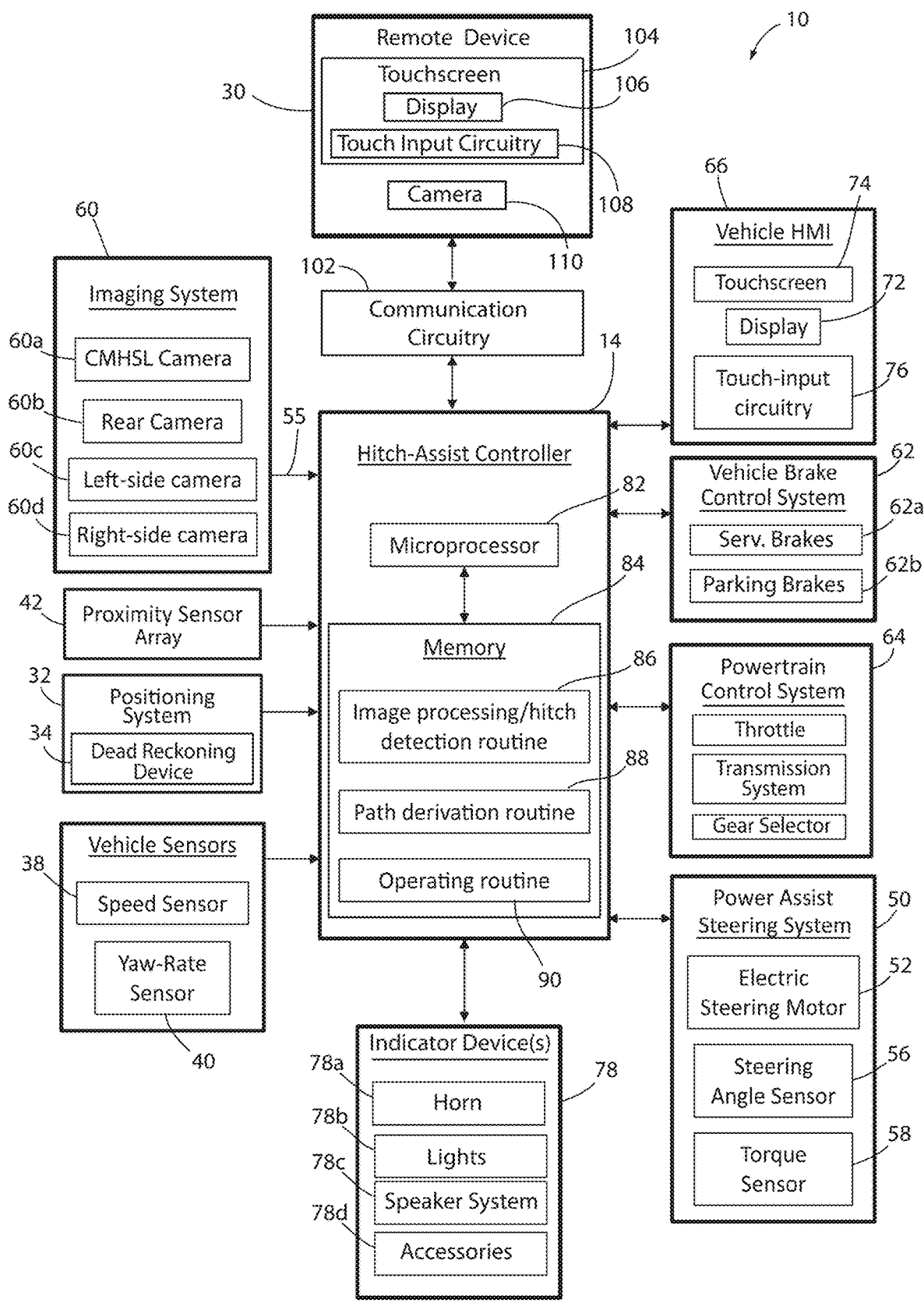
FIG. 2 is a diagram of a system according to an aspect of the disclosure for assisting in aligning the vehicle with a trailer in a position for hitching the trailer to the vehicle.
Figure 3:
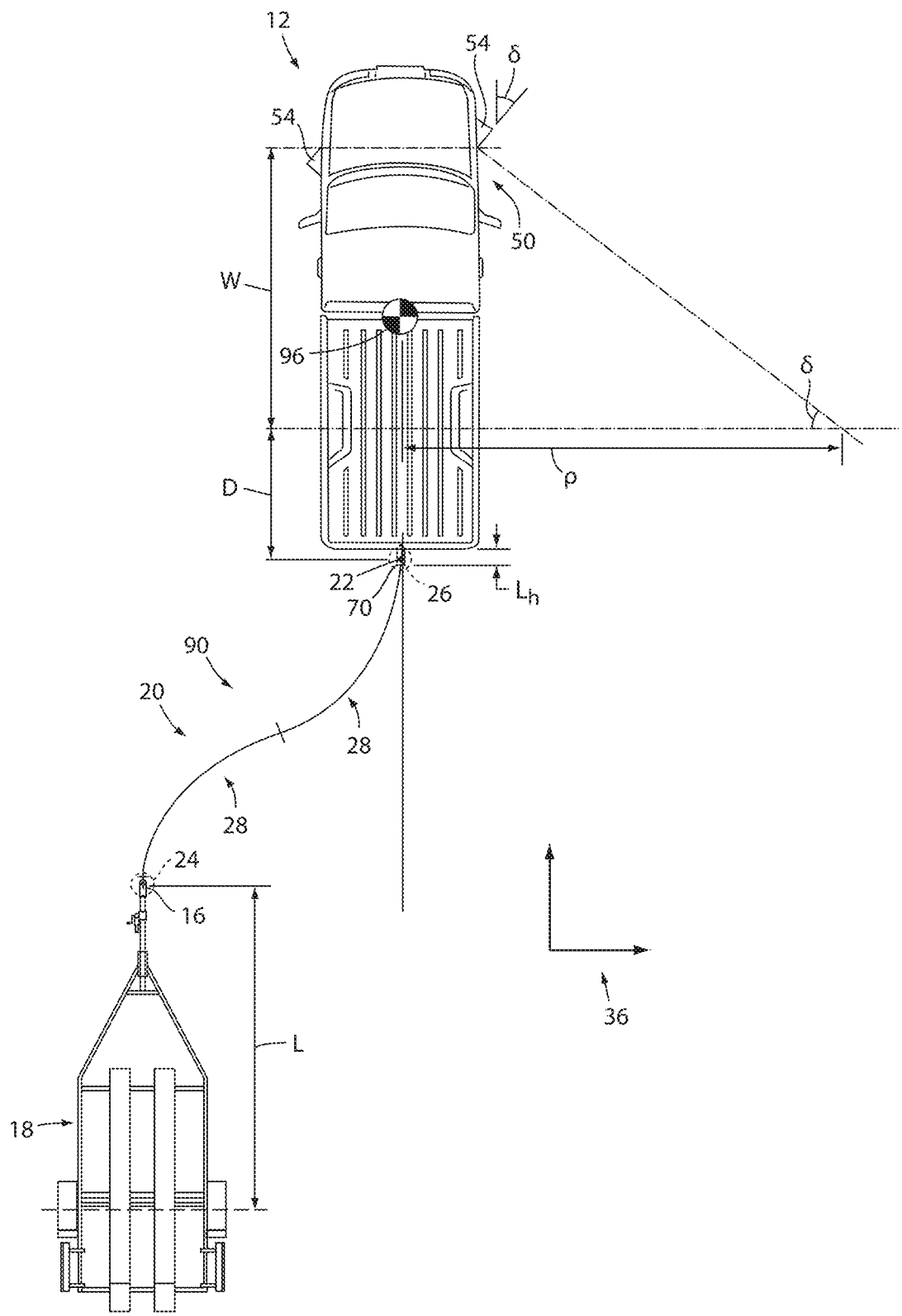
FIG. 3 is an overhead schematic view of a vehicle during a step of the alignment sequence with the trailer.
Figure 4:
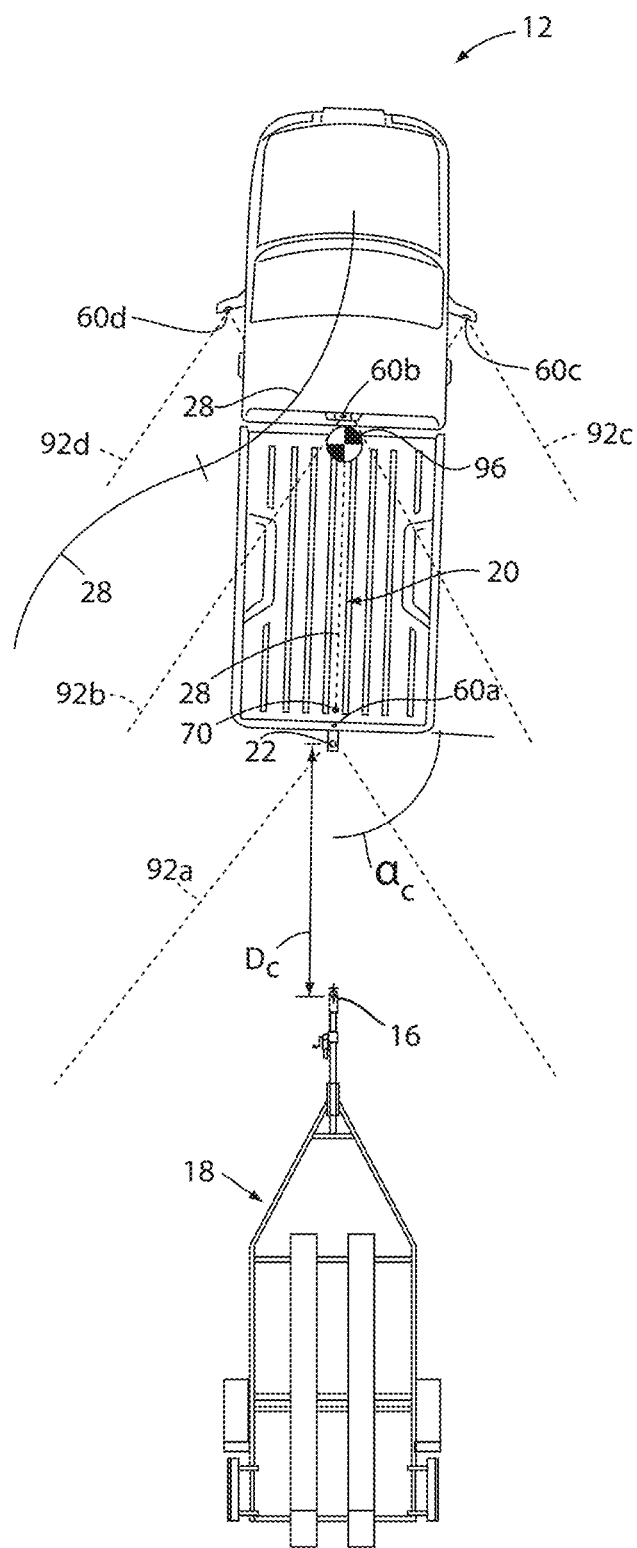
FIG. 4 is a plan view of a vehicle controlling the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition to or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from an inertial measurement unit (IMU) 40. In various embodiments, the IMU 40 may comprise or be in communication with a variety of sensors including, but not limited to, a gyroscope, an inclinometer, and/or an accelerometer. Additionally, the mass of the vehicle 12 may be measured by one or more weight sensors or pressure sensors in communication with the controller 14. Further, it is contemplated that in additional embodiments a proximity sensor 42, or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $α_c$) of coupler 16. As discussed herein, the proximity sensor 42 may correspond to a radar sensor, laser sensor, ultrasonic sensor, inductive, or various sensory devices that may be implemented or incorporated with the vehicle 12. In an exemplary embodiment, the at least one detection sensor may correspond to an image-based detection system (e.g., a camera system), which may comprise a plurality of imaging devices As further shown in FIG. 2, one embodiment of the hitch assist system 10 is in communication with the steering system 50 of vehicle 12. The steering system 50 may be a power-assist steering system 50 including a steering motor 52 to operate the steered wheels 54 (FIG. 1) of the vehicle 12 for moving the vehicle 12 in such a manner that the vehicle yaw changes with the vehicle velocity and the steering angle S. In the illustrated embodiment, the power-assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power-assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power-assist steering system 50 that senses torque on the steering wheel that is not expected from autonomous control of the steering wheel and, therefore, indicative of manual intervention. In this configuration, the hitch assist system 10 may alert the driver to discontinue manual intervention with the steering wheel and/or discontinue autonomous steering. In alternative embodiments, some vehicles have a power-assist steering system 50 that allows a steering wheel to be partially decoupled from the movement of the steered wheels 54 of such a vehicle.

With continued reference to FIG. 2, the power-assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to various vehicle 12 conditions to guide the vehicle 12 along the desired path 20 (FIG. 3). It is conceivable that the hitch assist system 10, in additional embodiments, may be an integrated component of the power-assist steering system 50. For example, the power-assist steering system 50 may include a hitch assist algorithm for generating vehicle steering information and commands as a function of all or a portion of information received from an imaging system 60, the power-assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly, in operation, the controller 14 may be configured to control the brakes 62a and 62b as well as to detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle IMU 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate the speed of the vehicle 12 during alignment of the vehicle 12 with the coupler 16 of trailer 18, which can reduce the potential for contact with trailer 18 and can bring vehicle 12 to a complete stop at a determined endpoint 70 of the path 20. It is disclosed herein that the hitch assist system 10 can additionally issue an alert signal corresponding to a notification of an actual, impending, and/or anticipated contact with a portion of trailer 18. As mentioned above, regulation of the speed of the vehicle 12 may be advantageous to prevent contact with trailer 18.

In some embodiments, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some embodiments, the controller 14 may be configured to control a gear of the transmission system and/or prompt the user U to shift to a desired gear to complete semi-automated operations of the vehicle 12.

As previously discussed, the hitch assist system 10 may communicate with a human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place of or in addition to touchscreen 74. Further, the hitch assist system 10 may communicate via wireless communication with another embodiment of the HMI 66, such as with one or more handheld or remote devices 80 (FIG. 1), including one or more smartphones. The remote device 80 may also include the display 72 for displaying one or more images and other information to a user U. For instance, the remote device 80 may display one or more images of the trailer 18 on the display 72 and may be further configured to receive remote user inputs via touchscreen circuitry 76. Additionally, the remote device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the remote device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receives information from the above-described sensors and vehicle systems, including the imaging system 60, the power-assist steering system 50, the vehicle brake control system 62, the powertrain control system 64, and other vehicle sensors and devices. The controller may communicate with the various devices described herein via a communication network of the vehicle 12, which can include a controller area network (CAN), a local interconnect network (LIN), or other protocols used in the automotive industry. The controller 14 may generate vehicle steering information and commands as a function of all or a portion of the information received. Thereafter, the vehicle steering information and commands may be provided to the power-assist steering system 50 for affecting the steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86, a path derivation routine 88, and an operating routine 90.

It should be appreciated that the controller 14 may be a stand-alone dedicated controller or may be a shared controller integrated with other control functions, such as integrated with a vehicle sensor system, the power-assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of any other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92a, 92b, 92c, and 92d to correspond with rear camera 60a, CHMSL camera 60b, and side-view cameras 60c and 60d, respectively. In this manner, image data from two or more of the cameras can be combined in image processing routine 86, or in another dedicated image processor within imaging system 60, into a single image.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, the image processing routine 86 may be programmed with identifying characteristics of the marker for location in image data, as well as the positioning of coupler 16 relative to such a marker, so that the position 24 of the coupler 16 can be determined based on the marker location.

As shown in FIG. 3, the image processing routine 86 and operating routine 90 may be used in conjunction with each other to determine the path 20 along which hitch assist system 10 can guide vehicle 12 to align hitch 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch 22. In this manner, upon initiation of hitch assist system 10, such as by user input on touchscreen 74, for example, image processing routine 86 can identify coupler 16 within the image data of camera 60c and estimate the position 24 of coupler 16 relative to hitch 22. The position 24 of the coupler 16 may be identified by the system 10 using the image data by receiving focal length information within image data to determine a distance $D_c$ to coupler 16 and an angle $\alpha_c$ of offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch position 26 of the vehicle hitch 22 with coupler 16.

Still referring to FIGS. 3 and 4 with additional reference to FIG. 2, controller 14, having estimated the positioning $D_c$, $\alpha_c$ of coupler 16 as discussed above, can, in one example, execute path derivation routine 88 to determine vehicle path 20 to align the vehicle hitch 22 with coupler 16. In particular, controller 14 can have stored in memory 84 various characteristics of vehicle 12, including the wheelbase W, the distance D from the rear axle to the hitch 22, and the drawbar length $L_h$, as well as the maximum angle to which the steered wheels 54 can be turned $\delta_{max}$ and the turning radius $\rho$. Accordingly, the system 10 may provide for the detection of the coupler position 24 in the image data and control the vehicle 12 to maneuver along the vehicle path, such that the hitch 22 is aligned close to the coupler 16 for connection.

Referring again to FIGS. 1 and 2, in some instances, the HMI 66 further includes an input device, which can be implemented by configuring the display 72 as a portion of the touchscreen 74 with input circuitry 76 to receive an input corresponding with a location over the display 72. Other forms of input, including one or more joysticks, digital input pads, or the like, can be used in place of or in addition to touchscreen 74.

Further, the hitch assist system 10 may be communicatively coupled via communication circuitry 102 with one or more handheld or remote devices 30 (FIG. 1), which may additionally and/or alternatively be configured as the user input device. The communication circuitry 102 may include a radio frequency transmitter and receiver for transmitting and receiving signals. The signals may be configured to transmit data and may correspond to various communication protocols. The communication circuitry 102 may be used to send and receive data and/or audiovisual content. The communication circuitry 102 may utilize one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver configured to communicate via one or more wireless protocols (e.g., a Bluetooth®, Bluetooth® Low Energy [BLE], Ultra-Wideband [UWB]; and Z-Wave®; Zigbee®, Wi-Fi [802.11a, b, g, n, etc.], IrDA, RFID, etc.), local area networks (LAN), wide area networks (WAN), including the Internet, GSM, CDMA, WCDMA, GPRS, MBMS, WiMax, DVB-H, ISDB-T, etc., as well as advanced communication protocols that may be developed at a later time.

The remote device 30 may also include a touchscreen 104 having a display 106 for displaying graphic data and other information to the user U and a touch input circuitry 108. For instance, the remote device 30 may display the graphic data of the trailer 18 on the display 106 and may be further configured to receive remote user inputs via the touch input circuitry 108. Also, the remote device 30 may comprise a camera 110 configured to capture image data that may be communicated to the system 10 or a remote database, such that the image data may be utilized to train the trailer detection model as further discussed in reference to FIGS. 5-8. The remote device 30 may also provide feedback information, user instructions, and demonstrate instruction to assist the user U in the completion of the methods described herein. It will be appreciated that the remote device 30 may be any one of a variety of computing devices and may include a processor and memory. For example, the remote device 30 may be a cell phone, mobile communication device, key fob, wearable device (e.g., fitness band, watch, glasses, jewelry, wallet), personal digital assistant, headphones, and/or other devices that include capabilities for wireless communications and/or any wired communications protocols.

Referring now to FIGS. 5-8, a method for directing the user U to control the system 10 to collect image data 112 depicting the trailer 18 to train the trailer detection model is discussed in further detail. As previously discussed, the methods and systems described herein may be implemented to train the system 10 to identify new types of trailers or improve/optimize the detection of trailers types already programmed in the system 10. For example, in some cases, the trailer 18 may correspond to one of the preconfigured or pre-trained trailer types but may suffer from errors or have limited operating efficacy when identifying a specific trailer. Such errors may be the result of lighting or color conditions of the trailer 18, modifications to the trailer 18, or issues with the robustness of the trailer detection model in reference to one or more of the trailer types. Accordingly, the disclosure provides for user methods and procedures to generate or improve a template for identifying the trailer to improve a capability of the system 10 to detect trailer types that are not preconfigured for detection by the system 10 and/or improve the existing algorithms and trained models for trailer types that are not readily or consistently identified by the trailer detection model. To improve the trailer detection model, the disclosure provides for methods and systems enabling the user U to gather image data 112 depicting the trailer 18 from a variety of perspectives with the imaging system 60 and/or the camera 110 of the remote device 30.

Figure 5:
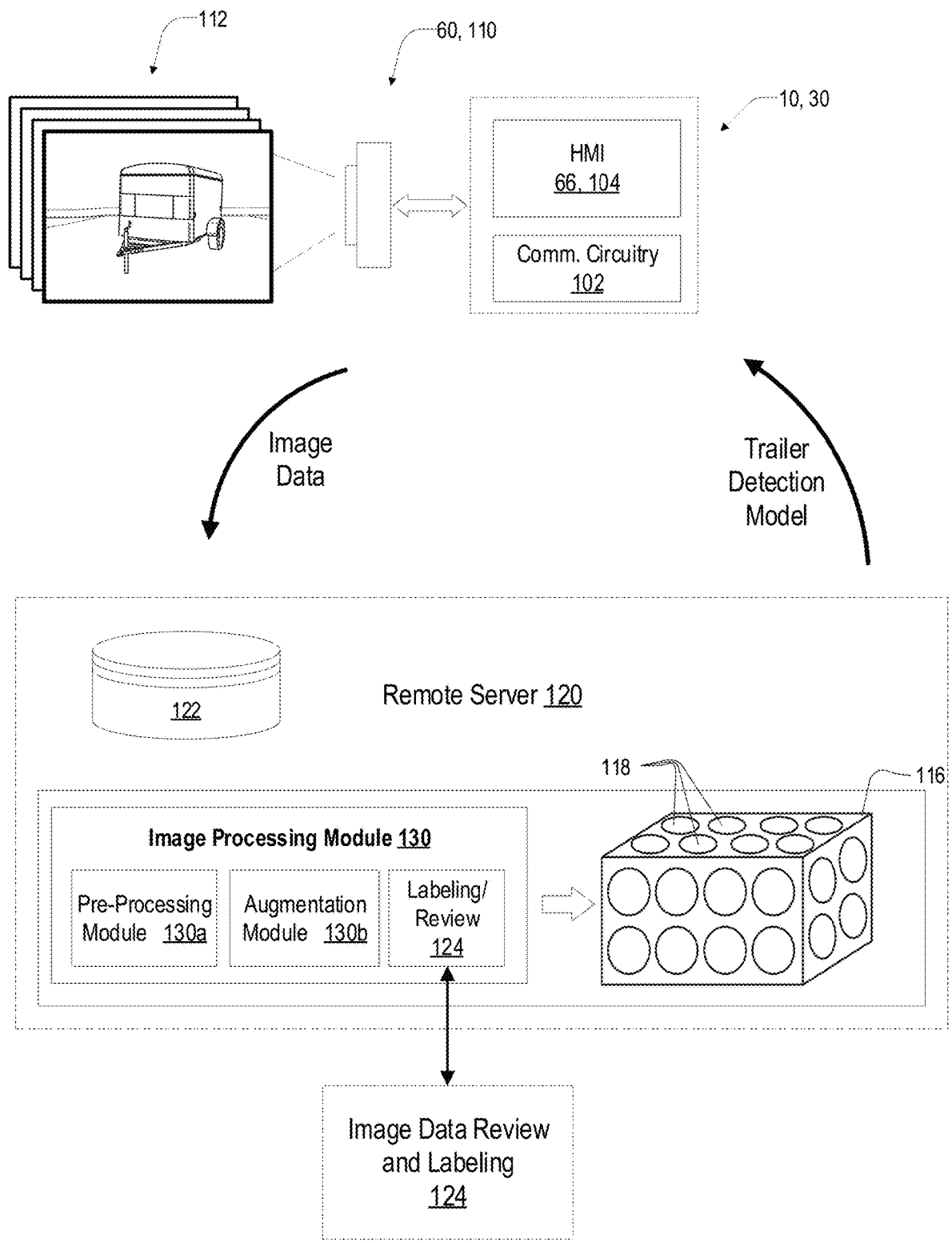
FIG. 5 is a depiction of an image received from a vehicle camera during an alignment sequence step with a target overlaid thereon.
Figure 6:
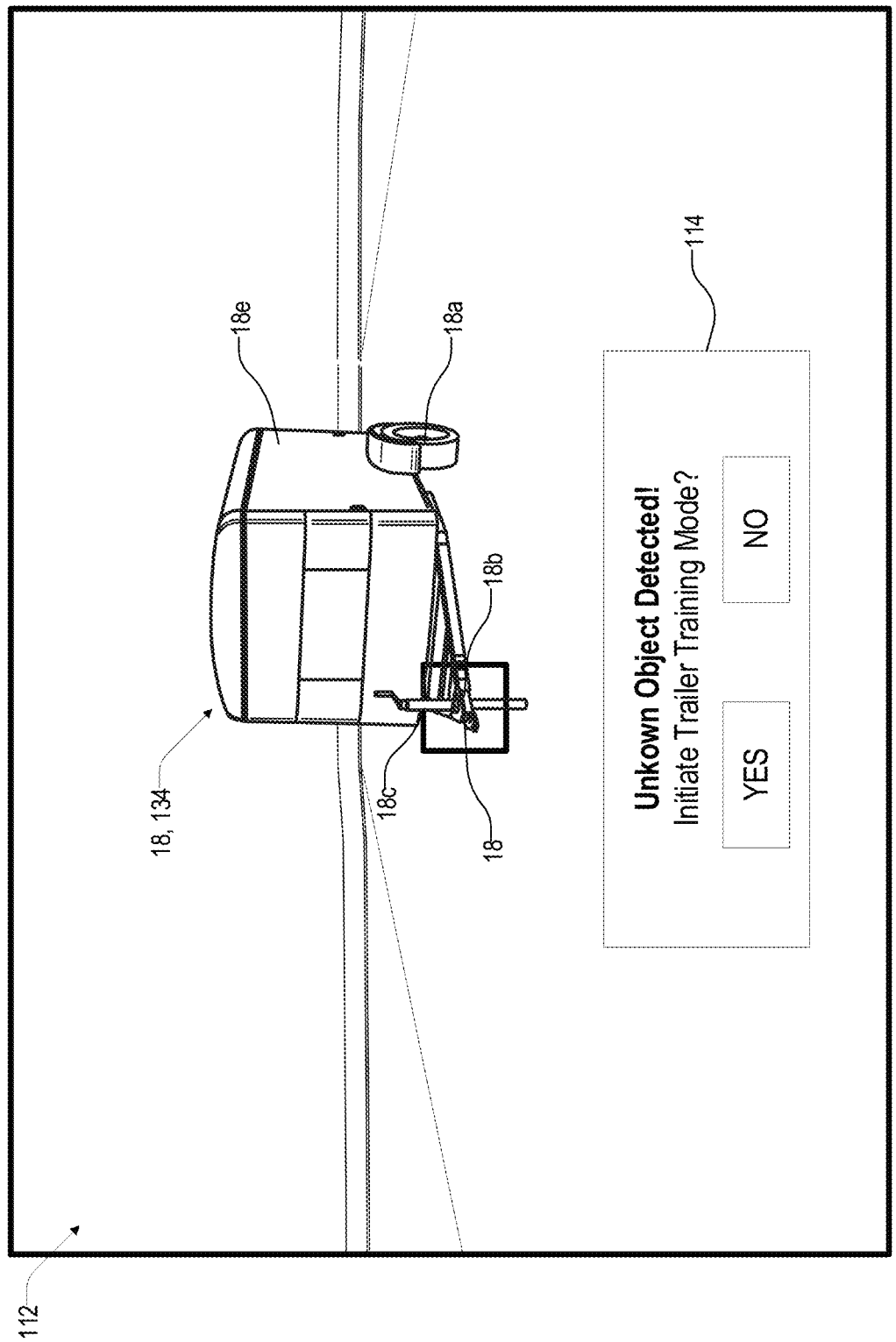
FIG. 6 is a process diagram demonstrating a method of training a detection model based on image data captured by a vehicle.

As demonstrated in FIG. 5, the disclosed systems and methods may utilize a neural network 116 comprising a plurality of neurons 118 to improve the robustness and accuracy of the trailer detection model processed by the system 10. In general, the disclosure provides for image data 112 to be gathered in the field by the user U via a guided process configured to capture the image data 112 or training data necessary to modify and improve the training of the trailer identification model. In this way, the system 10 may be trained via a user-initiated procedure, such that the trailer detection model accurately detects a specific trailer that is not recognized by the existing iteration of the trailer detection model. Such a procedure may reduce customer dependency on manufacturer driven modifications to the trailer detection model and lead to significantly improved operation of the system 10 as well as improved user satisfaction.

In operation, the modification of the trailer detection model may be initiated by an identification error in the system 10. An example of such an error is further discussed in reference to FIG. 6 resulting from a request for a hitch detection and alignment that cannot be processed due to an error in the image processing routine 86 to identify a trailer 18 and/or the coupler 16 in the image data 112 captured by the imaging system 60. In response to the error detection, the system 10 may prompt the user U, via a dialogue box 114 or other forms of notification on the HMI 66 or via the remote device 30, to select a trailer training mode. If selected, the trailer training mode guides the user U through a series of steps with the vehicle 12 and/or with the remote device 30 to capture image data 112 of the trailer 18 from a plurality of perspectives and distances. The result of the trailer training mode is the collection of image data 112 (e.g. frames, video, etc.) depicting the features of the trailer 18 and the variations in perspective necessary to train or update the trailer detection model to detect the trailer 18. The specific details of the trailer training mode are discussed at length in reference to FIGS. 6-9.

Still referring to reference to FIG. 5, upon capturing the image data 112, the system 10 may communicate the image data 112 and any additional training information (e.g., user-defined labels, relative depth information, etc.) corresponding to the image data 112 to a remote server 120 via the communication circuitry 102. Once received by the remote server 120, the image data 112 may be stored in a database 122. The image data 112 may then be reviewed and labeled via a review process 124 in preparation for entry into the neural network 116. The image data 112 review and labeling procedure may include human identification and verification identifying features of the trailer 18 as well as the determination that the trailer 18 is in viable for utilization with the vehicle 12. The features identified or verified by the review process 124 may include various features of the trailer 18 and particularly may include those implemented by the trailer detection module to determine the coupler position 24. For example, the review process 124 may identify the wheels 18*a*, a tongue 18*b*, a winch stand 18*c*, bunks 18*d*, a trailer body 18*e*, etc. Following the labeling and verification of the trailer 18 in the image data 112, the remote server 120 may supply the labeled and pre-processed image data to the neural network 116 to train and update the trailer detection model.

In various cases, the remote server 120 may comprise one or more image processing modules 130, which may correspond to multiple specialty processors and systems configured to process the image data 112 and train the neural network 116. In operation, the image processing module 130 may process the image data 112 via a plurality of processing modules. For example, in some implementations, the image processing module 130 may comprise a pre-processing module 130*a*. The pre-processing module 130*a* may be configured to crop each image frame captured by the imaging system 60 and/or the camera 110 of remote device 30. The cropping of the image data 112 may be consistently processed based on the positional relationship of one or more features of the trailer 18 identified in the image data 112. The features may include, but are not limited to, the wheels 18*a*, a tongue 18*b*, a winch stand 18*c*, bunks 18*d*, a trailer body 18*e*, etc. In this way, the image data 112 supplied to the neural network 116 may be limited in positional variation to improve the sample data provided to the neural network 116.

The image processing module 130 may further comprise an image augmentation module 130*b* configured to augment the image data 112 by a variety of techniques. For example, the cropped image data 112 received from the image pre-processing module 130*a* may be augmented by the image augmentation module 130*b* by various techniques including, but not limited to, flipping, rotating, translating, scaling, color-enhancing, histogram stretching, noise filtering, selective noise inclusion, etc. Following processing of the image data 112 via the image pre-processing module 130*a* and/or the image augmentation module 130*b*, the processing module 130 may further process the image data 112 via one or more processing techniques or feature extraction techniques (e.g. Hough transform) to identify the wheels 18*a*, a tongue 18*b*, a winch stand 18*c*, bunks 18*d*, a trailer body 18*e*, etc. The identification of such features of the trailer 18 may accordingly be first identified by the processing module 130 and supplied for the review process 124 or the features may be identified by the review process 124 and supplied to the processing module 130 for image optimization before training via the neural network 116.

Once the image data 112 is received by the neural network 116, a deep learning procedure may be implemented to regress or estimate the locations and proportions of the trailer 18 and the coupler position 24 in the image data 112 or frames. For example, the neural network 116 may be implemented as a deep convolutional network. The architecture of the neural network 116 may be a plurality of convolutional networks followed by activation functions. To help avoid overfitting, dropout layers and other regularization techniques may be implemented. In an exemplary embodiment, fully connected layers at the end of the neural network 116 are responsible for identifying and outputting the coupler position 24 and a heading direction of the trailer 18.

In general, the neural network 116 may comprise a plurality of neurons 118, which may be arranged in a three-dimensional array comprising a width, a depth, and a height. The arrangement of the neurons 118 in this configuration may provide for each layer (e.g. dimensional cross-section of the array) to be connected to a small portion of the preceding layer. In this way, the neural network 116 may process the data through regression to reduce each image to a single vector to identify the coupler position 24 and a heading direction of the trailer 18. Accordingly, the neural network 116 may transform each frame of the image data 112 layer by layer from original pixel values to the final output. In general, the specific architecture of the neural network 116 may vary as would be understood by those having ordinary skill in the art. In this way, the modification of the trailer detection model may be completed by fine-tuning earlier iterations or versions of the model via the neural network 116. Examples of pre-trained models that may be implemented to generate the trailer detection model may include but are not limited to the following: LeNet, AlexNet, ZF Net, GoogLeNet, VGGNet, ResNet, etc.

The number of image samples necessary to update the training of the trailer detection model may be determined based on experimental data identified during the training of the trailer detection model. Accordingly, the image data 112 necessary to train the trailer detection model may correspond to the diversity and distribution requirements of the model. That is, the number of image frames should be numerous enough to depict the trailer 18 from various perspectives and may also require depictions of the trailer 18 representing or simulating diverse environmental conditions. In some cases, the image data 112 may be modified to satisfy the diversity requirements for training. Regardless of the diversity and distribution requirements, the methods described in reference to FIGS. 6-9 may be implemented to collect the image data 112 via interaction between the system by the user U and/or via one or more automated routines of the vehicle 12. Accordingly, the disclosure may provide for the collection of the image data 112 necessary to communicate to the remote server 120, such that the trailer detection model may accurately detect the previously unidentified trailers or variations in known trailer types that cause the preprogrammed or factory configured detection models to be unable to identify a trailer. In this way, the disclosure provides for an improved method for training the system 10 to identify new trailer types previously untrained or tune the trained models supplied in the factory or original software to improve the robustness of the detection of a type of the trailer 18 to better identify the coupler position 24.

Figure 7:
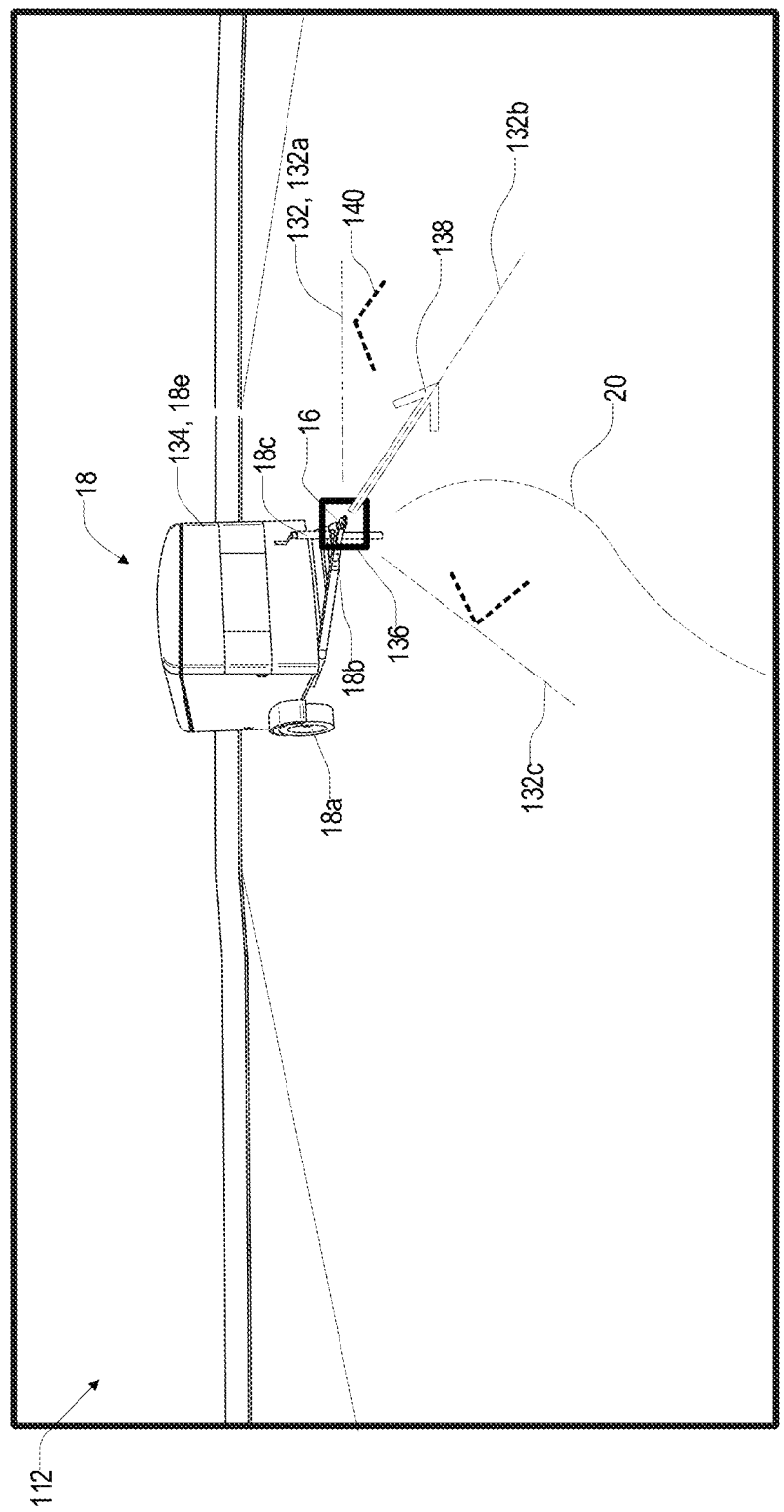
FIG. 7 is a projected view of a vehicle and a trailer demonstrating a plurality of vehicle positions adjusting a field of view of a camera to capture image data of the trailer demonstrating a variety of perspectives.
Figure 8A:
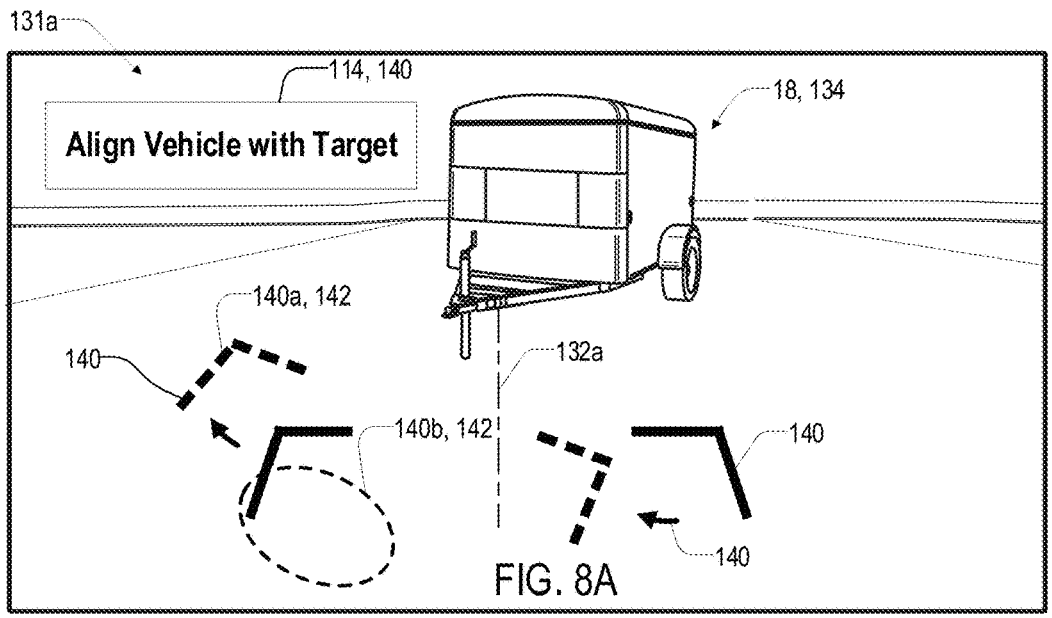
FIG. 8A is a depiction of image data captured by a camera of the vehicle from a first perspective as introduced in FIG. 5.
Figure 8B:
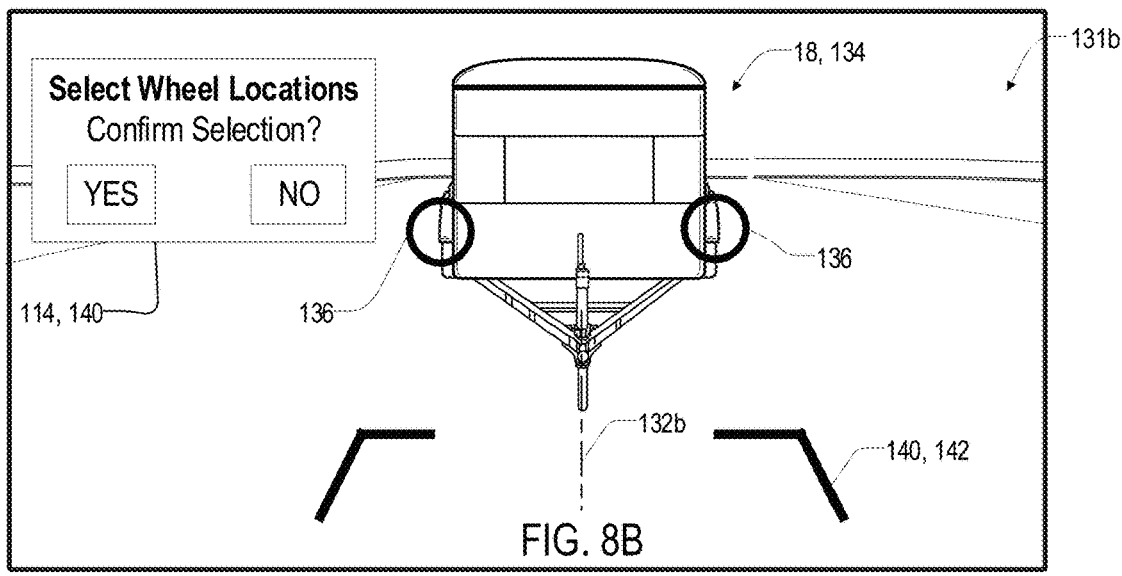
FIG. 8B is a depiction of image data captured by a camera of the vehicle from a second perspective as introduced in FIG. 5.
Figure 8C:
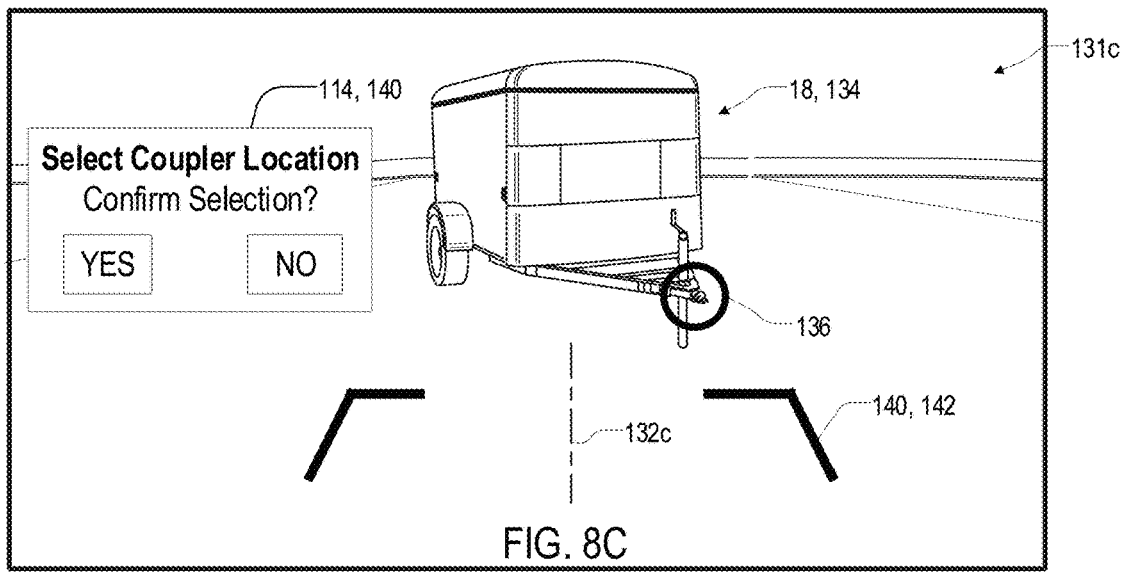
FIG. 8C is a depiction of image data captured by a camera of the vehicle from a third perspective as introduced in FIG. 5.

Referring now to FIGS. 6, 7, 8A, 8B, and 8C; as previously discussed, the trailer training mode may be activated by the system 10 in response to an error in the hitch detection routine 86 to identify a trailer 18 and/or the coupler 16 in the image data 112 captured by the imaging system 60. In response to the error detection, the system 10 may prompt the user U, via the dialogue box 114 or another form of notification on the HMI 66 or via the remote device 30, to select a trailer training mode. If selected, the trailer training mode guides the user U through a series of steps with the vehicle 12 and/or with the remote device 30 to capture image data 112 of the trailer 18 from a plurality of perspectives and distances. Examples of such perspective views 131a, 131b, and 131c of the trailer 18 are shown in FIGS. 8A, 8B, and 8C and may be captured by aligning the vehicle 12 with the trailer 18 along a plurality of alignment vectors 132a, 132b, 132c shown in FIG. 7.

Upon initiation of the training mode, the controller 14 of the system may process the image data 112 and identify portions that include trailer features identified as corresponding to a potential trailer 134. The features may include, but are not limited to, the coupler 16, wheels 18a, a tongue 18b, a winch stand 18c, bunks, a trailer body 18e, etc. In such cases, the portions of the image data 112 that depict the features of the potential trailer 134 or trailers may include objects detected in the image processing routine 86 that were not detected with sufficient certainty to automatically identify the trailer 18 and the coupler 16. Additionally, features that are not identifiable by the system 10 may be identified by selecting corresponding portions of the image data 112 via the vehicle HMI 66 and/or via the remote device 30. Examples of such selections of the wheels 18a and the coupler 16 are demonstrated in FIGS. 8B and 8C, respectively. The selections may also be confirmed by the user U to verify a selection or detection of the features in the image data 112 as detected by the controller 14.

Once the features of the potential trailer 134 are identified, the trailer features may be emphasized and outlined with graphical identifiers 136 in the image data 112 by the controller 14 and demonstrated on the display screen 72 of the vehicle HMI 66 and/or the display 106 of the remote device 30. In this way, the system 10 may present the potential trailer 134 and corresponding features in the image data 112 for review by the user U and calculate a trailer heading direction 138 and coupler position 24 based on the features identified in the image data 112. Once the trailer heading direction 138 and the coupler position 24 of the potential trailer 134 are identified by the controller 14 in the training mode, the controller 14 may continue to determine a procedure for capturing the image data and corresponding representations of the trailer 18 necessary to update the trailer detection model.

In general, the controller 14 may calculate the alignment vectors 132a, 132b, 132c to guide the user U of the system 10 to capture the image data 112 depicting the trailer 18 in each of the corresponding perspective views 130a, 130b, and 130c. As shown in FIGS. 7 and 8A, the controller 14 may present various directional or alignment instructions 140 and a target position 142 of the vehicle 12 to assist the user U to capture the image data 112 in each of the perspective views 131a, 131b, and 131c. Accordingly, the user U may maneuver the vehicle to align with the trailer 18, such that the image data 112 of the potential trailer 134 for identification may be captured. For example, the controller 14 may monitor the orientation of the trailer heading direction 138 relative to an orientation of the vehicle 12 and demonstrate the alignment instructions 140 as directional arrows and instructions (e.g. the alignment instructions 140) guiding the user U to navigate the vehicle 12 to each of the locations aligning the vehicle 12 with the alignment vectors 132 as depicted in FIG. 8A.

Referring again to FIG. 7, in some instances, the controller 14 may be configured to automatically maneuver the vehicle 12 to each of the target positions 142 to align the vehicle with each of the alignment vectors 132. For example, once the coupler position 24 and the trailer heading direction 138 of the potential trailer 134 are identified in the image data, the controller 14 may initiate the path derivation routine 88 and the operating routine 90, such that the system 10 navigates the vehicle 12 to align with each of the alignment vectors 132. When calculating the vehicle path 20, the controller 14 may position one or more waypoints along the vehicle path 20 to orient one or more fields of view of the imaging system 60 to capture the image data 112 depicting the trailer 18. An example of a waypoint is the position of the vehicle 12 positioning the field of view 92a to capture the image data 112. Accordingly, the system 10 may be configured to control the vehicle 12 to traverse vehicle paths orienting the vehicle 12 with each of the alignment vectors 132 and one or more waypoints along the vehicle paths between the alignment vectors 132. In this way, the system 10 may automatically maneuver the vehicle 12 under the supervision of the user U to capture the image data 112 in each of the perspective views 131a, 131b, 131c as well as the waypoints along the vehicle path 20.

In addition to the capture of the image data via the imaging system 60, the controller 14 may similarly communicate with the remote device 30 and communicate the alignment vectors 132 to the user U, such that the user U may control the camera 110 to capture the image data 112. In some cases, the remote device may include software similar or communicate with the remote server 120 to process the image data 112 independent of the controller 14. For example, the remote device may include one or more applications that include image processing utilities similar to the image processing routine 86. Additionally, similar to the controller 14, the remote device 30 may be configured to demonstrate one or more of the dialogue box 114, the graphical identifiers 136, alignment instructions 140, etc. directing the user U to the alignment vectors 132 to capture the image data with the camera 110 of the remote device 30. As depicted in FIG. 8A, the alignment instructions 140 are depicted as a vehicle target position 140a and a user target position 140b. Accordingly, the trailer training routine as discussed herein may be completed via the remote device 30 and/or in combination with the controller 14 to capture the image data 112 and label the image data 112 for transmission to the remote server 120. The disclosure provides for flexible methods to update the trailer detection model to automatically detect the potential trailer 134 in the image data 112.

In general, the graphical identifiers 136 and alignment instructions 140 may be superimposed over the image data 112 as rendered graphical representations or graphic data and displayed on the displays 72, 106. Accordingly, the graphic data may provide the user U with interactive instructions overlaid on the image data 112 demonstrating directional instructions for locating the vehicle 12 or a location of the user U from which to capture the image data 112 for updating the trailer detection model. Accordingly, the instructions provided per the disclosure may be in the form of audible instructions, written instructions demonstrated on one of the displays 72, 106, graphical instructions overlaid on the image data 112, and/or augmented reality instructions demonstrating a rendered depiction of the vehicle 12 or the user U positioned to capture the image data 112.

Figure 9:
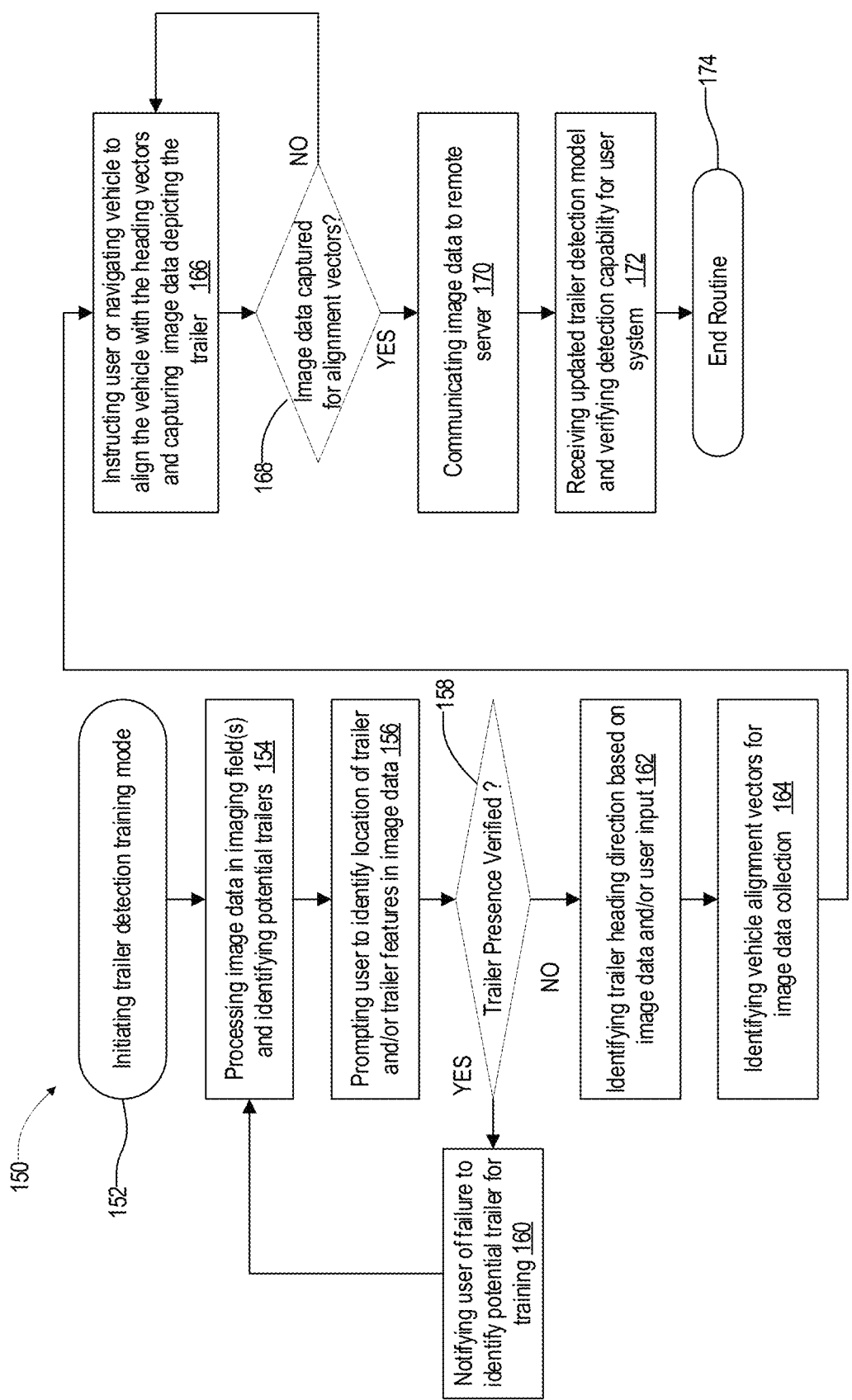
FIG. 9 is a flow chart demonstrating a method for guiding a user to capture image data to generate a trained model for identification of a trailer in accordance with the disclosure.

Referring now to FIG. 9, a flow chart is shown demonstrating a method 150 for a trailer training procedure for updating the trailer detection model. As previously discussed, the method 150 may be initiated in response to an error of the system 10 to automatically detect the trailer 18 and the coupler 16 in the image data. As a result, the trailer detection training mode may be selectively activated by the user U as demonstrated in FIG. 6. In operation, the method 150 may begin by processing image data in one or more fields of view as captured by the imaging system 60 and/or the camera 110 of the remote device 30 (152). Once the initial image data depicting the trailer 18 is captured, the controller 14 and/or the remote device 30 may process the image data to identify a potential trailer 134 (154). The potential trailer 134 may correspond to an object that conforms to one or more characteristics of the trailer identification model but is not identified with a sufficient confidence to activate automatic detection of the trailer 18. In such cases, the method 150 may be partially automated and only require feedback and verification (see FIGS. 8B and 8C) that the potential trailer 134 is viable for connection to the vehicle 12. Similar to the verifications, in cases that the controller 14 cannot detect one or more features of the trailer 18, the method 150 may prompt the user U to identify a location of the trailer 18 and/or trailer features in image data via the HMI 66 and/or the remote device 30 (156).

Following step 156, the method 150 may determine whether the presence of the trailer 18 is verified based on the features of the potential trailer identified by the controller 14 and/or the verifications or identifications of features of the trailer 18 identified by the user (158). If the features necessary to verify the presence are not identified, the method may notify the user U of an error in the trailer detection training (160). If the features of the trailer 18 are identified, the method 150 may continue to step 162 to identify an estimated trailer heading direction 138 and the coupler position 24. Based on the trailer heading direction 138 and the coupler position 24, the method may identify the vehicle alignment vectors 132 (or more generally the camera alignment vectors from which the image data 112 is captured to update or modify the trailer detection model (164).

Once the alignment vectors 132 are identified, the method 150 may continue to communicate instructions (e.g. audio, visual, symbolic, etc.) instructions to the user U to control the vehicle 12 to align with the heading vectors (166). Upon reaching each of the instructed locations, the method 150 may control the imaging system 60 or the camera 110 to capture image data (e.g. still frames, video frames, etc.) depicting the trailer 18 in each of the perspective views 130a, 130b, 130c. Similarly, in some instances, the controller 14 may be configured to navigate the vehicle 12 to align with imaging system 60 to capture the image data 112 in each of the perspective views 130a, 130b, 130c. In step 168, the method 150 may verify that the image data 112 is captured in each of the perspective views 130a, 130b, 130c (168). Upon successful capture of the image data 112, the controller 14 or the mobile device 30 may utilize communication circuitry as discussed herein to communicate the image data to the remote server 120 (170). Following the processing of the image data by the remote server 120 as discussed in reference to FIG. 5, the updated trailer detection model may be received by the controller 14, such that the detection routine may be optimized or otherwise updated to accurately detect the potential trailer 134 as a compatible trailer as discussed herein (172). In some instances, a verification of the automated identification of the trailer 18 in the image data 112 may be completed before ending the routine in step 174.

It is to be understood that variations and modifications can be made on the aforementioned structures and methods without departing from the concepts of the present invention, and further it is to be understood that such concepts are intended to be covered by the following claims unless these claims by their language expressly state otherwise.

It will be understood by one having ordinary skill in the art that construction of the described device and other components is not limited to any specific material. Other exemplary embodiments of the device disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent or may be removable or releasable unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. A trailer identification system for a vehicle comprising:
an imaging device configured to capture image data depicting a trailer;
a user interface configured to communicate with a user; and
a controller that:
processes the image data and applies a trailer detection model configured to detect a trailer depicted in the image data;
activates a detection training routine for the trailer;
captures the image data of the trailer from a plurality of perspectives relative to a trailer heading of the trailer; and
controls an update procedure configured to generate a modified trailer detection model operable to detect the trailer, wherein the update procedure processes the image data from the plurality of perspectives.

2. The system according to claim 1, wherein the controller further:
receives an input via the user interface identifying a feature of the trailer; and
identifies the trailer heading based on an orientation of the feature in the image data.

3. The system according to claim 2, wherein the controller further:
applies a label identifying the feature in response to the input, wherein the trailer identification model is modified based on the image data and the label identifying the feature.

4. The system according to claim 3, wherein the update procedure comprises:
communicating the image data to a remote server, wherein the remote server processes the image data and modifies the trailer identification model via a neural network.

5. The system according to claim 4, wherein the controller further:
receives a modified trailer identification model from the remote server;
captures additional image data of the trailer with the modified trailer detection model; and
in response to detecting the trailer in the image data with the modified trailer detection model, communicates a verification of the detection to the remote server.

6. The system according to claim 1, wherein the controller is further configured to display instructions on a display of the user interface, wherein the instructions demonstrate the plurality of perspectives for alignment.

7. The system according to claim 6, wherein the instructions communicate a target position of the vehicle enabling the user to control the vehicle to align with the plurality of perspectives.

8. The system according to claim 1, wherein the controller further:
calculates a vehicle path based on the image data; and
controls a power steering system and a powertrain of the vehicle traversing the vehicle path, wherein the vehicle path aligns the vehicle with at least one of the plurality of perspectives.

9. The system according to claim 1, wherein the controller further:
communicates with a remote device comprising a camera, wherein the image data depicting the trailer is further captured via the camera and communicated to the controller.

10. The system according to claim 1, wherein the detection training routine is activated in response to an error of a detection routine to identify the trailer in the image data.

11. The system according to claim 10, wherein the error results from a detection of the trailer not satisfying a predetermined confidence threshold.

12. The method according to claim 1, further comprising:
displaying instructions demonstrating the plurality of perspectives for alignment shown relative to the trailer, wherein the instructions communicate a target position of the vehicle enabling the user to control the vehicle to align with the plurality of perspectives.

13. The method according to claim 1, wherein the method further comprises:
calculating a vehicle path based on the image data; and controlling a power steering system and a powertrain of the vehicle traversing the vehicle path, wherein the vehicle path aligns the vehicle with at least one of the plurality of perspectives.

14. The method according to claim 1, wherein the image data comprises first image data captured via an imaging system of a vehicle and second image data captured via a camera of the remote device; and wherein the method further comprises communicating with a remote device comprising a camera, wherein the image data depicting the trailer is further captured via the camera of the remote device.

15. The system according to claim 1, wherein the controller further:
   receives an input via the user interface identifying a feature of the trailer; and
   displays instructions on a display of the user interface, wherein the instructions demonstrate the plurality of perspectives for alignment.

16. A method for modifying a trailer detection routine for a vehicle trailer detection system, the method comprising:
   identifying a trailer in image data via a trailer detection model;
   activating a detection training routine for the trailer;
   capturing the image data of the trailer from a plurality of perspectives relative to a trailer heading of the trailer; and
   controlling an update procedure configured to generate a modified trailer detection model operable to detect the trailer.

17. The method according to claim 16, wherein the method further comprises:
   receiving an input via the user interface identifying or verifying a feature of the trailer; and
   identifying the trailer heading based on an orientation of the feature in the image data.

18. The method according to claim 17, wherein the method further comprises:
   applying a label identifying the feature in response to the input, wherein the trailer identification model is modified based on the image data and the label identifying the feature.

19. The method according to claim 18, wherein controlling the update procedure comprises:
   communicating the image data to a remote server; and
   modifying the trailer identification model by supplying the image data to a neural network based on the image data and the label.

20. A trailer identification system for a vehicle comprising:
   an imaging device configured to capture image data depicting a trailer;
   a user interface configured to communicate with a user; and
   a controller that controls a detection training routine for the trailer, the training routine comprising:
      processing the image data and applying a trailer detection model configured to detect a trailer depicted in the image data;
      identifying a trailer heading based on an orientation of the feature in the image data;
      capturing the image data of the trailer from a plurality of perspectives relative to a trailer heading of the trailer; and
      controlling an update procedure configured to generate a modified trailer detection model operable to detect the trailer, wherein the update procedure processes the image data from the plurality of perspectives.

* * * * *